United States Patent [19]

Sargent

[11] Patent Number: 5,277,306

[45] Date of Patent: Jan. 11, 1994

[54] SEE-THROUGH PLIABLE/PERFORATE FISHING TACKLE COVERING SYSTEM

[76] Inventor: Donald Ray Sargent, 1628 Rosehill Cir., St. Paul, Minn. 55108

[21] Appl. No.: 963,656

[22] Filed: Oct. 20, 1992

[51] Int. Cl.⁵ .................. B65D 85/00; A01K 97/08
[52] U.S. Cl. .................. 206/315.011; 43/25.2; 43/26; 150/154; 224/922
[58] Field of Search .................. 206/315.11; 150/154, 150/160, 161; 43/25.2, 26, 54.1; 224/922

[56] References Cited

U.S. PATENT DOCUMENTS

| | | | |
|---|---|---|---|
| 2,723,482 | 11/1955 | Marden | 206/315.11 X |
| 3,033,259 | 5/1962 | Landis, Sr. | 206/315.11 |
| 3,972,144 | 8/1976 | Geisler | 43/26 |
| 4,222,193 | 9/1980 | Beck | 43/26 |
| 4,418,490 | 12/1983 | Ancona | 43/25.2 |
| 4,441,274 | 4/1984 | Mazur | 43/25.2 |
| 4,546,877 | 10/1985 | Evans | 206/315.11 |
| 4,916,852 | 4/1990 | Zebleckis | 43/26 |
| 5,131,180 | 7/1992 | Ives | 43/25.2 |

OTHER PUBLICATIONS

Gun Sleeve, tradedress, pictorial representation, cloth sample (The Allen Company, Inc.).
LUR-KE lurekeeper, tradedress & sample copies (Gemini Sport Products) circa 1989.
Lure cover description, para. 4, Information Disclosure Statement, Nov. 25, 1992.
No Ouch Pouch, trade dress & sample copies (Chuck'-Sport Products Marketing).

*Primary Examiner*—Bryon P. Gehman
*Attorney, Agent, or Firm*—Christopher John Rudy

[57] ABSTRACT

Fishing tackle covers are useful separately or together: Fishing rod cover has a see-through pliable perforate sleeve with a closure flap. A fishing rod and reel assembly can be inserted into and removed from it repeatedly. Fishing rods can be protected from contact with other rods without the need for disassembly of rod, reel, line and even attached lure or hook. The rod cover keeps fishing lines from tangling, especially when used with other covers of the invention; it permits quick visual identification and rapid removal of the assembled rod combination ready for fishing; it facilitates drying out of any wet equipment it may cover, and it may be rolled up and kept that way easily for convenient stowage. For example, the rod cover may be made to primarily incorporate a fiberglass screen in its sleeve and closure flap. As well, fishing hook/lure cover is a purse having a panel set. The purse generally has insertion and extraction ends, with a repeatedly sealable border, and it is non-damaging to rod, line and hook and/or lure. The hook/lure cover may be transparent. For example, the hook/lure cover may be made to primarily incorporate clear vinyl in its panel set.

20 Claims, 3 Drawing Sheets

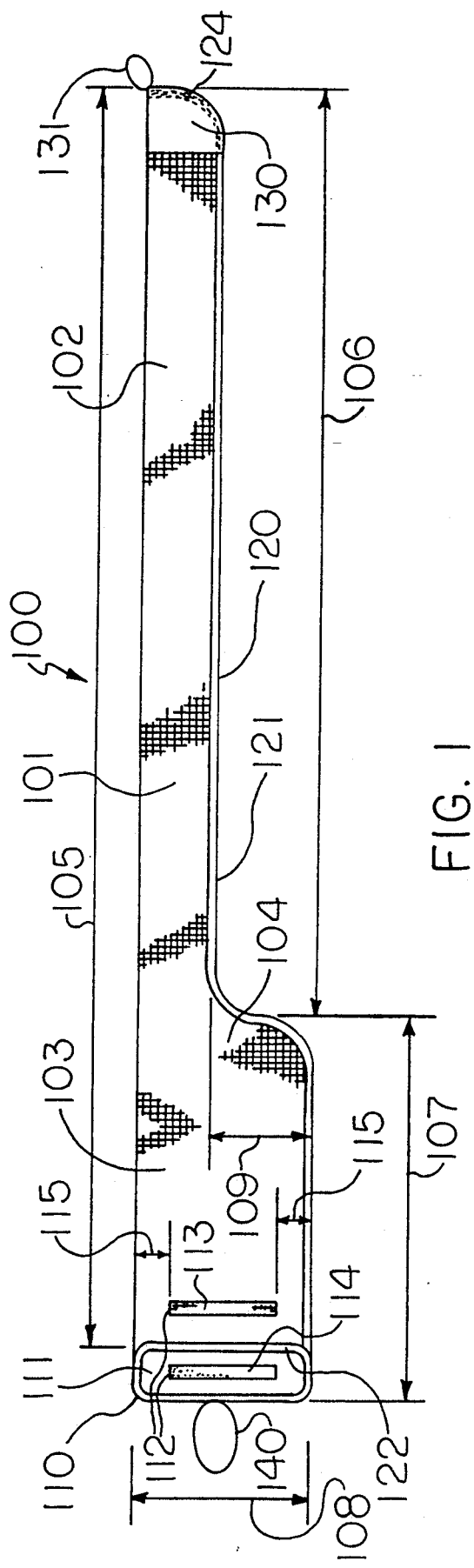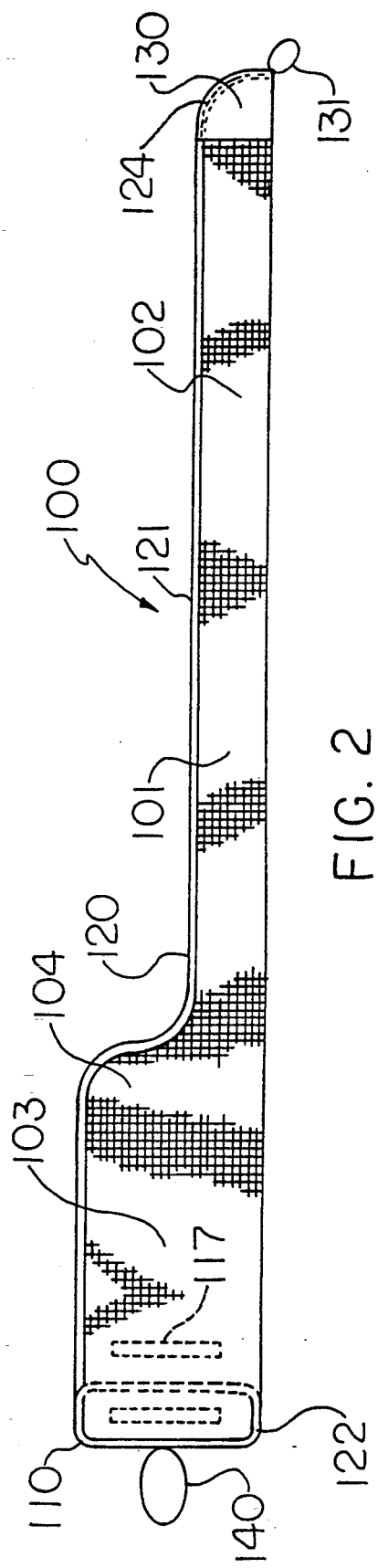

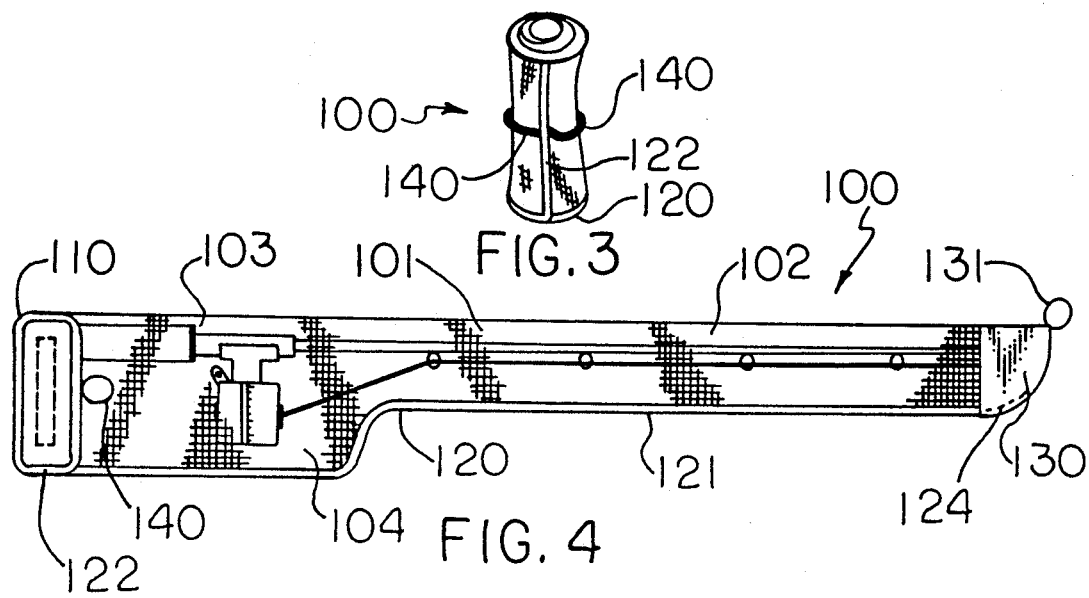
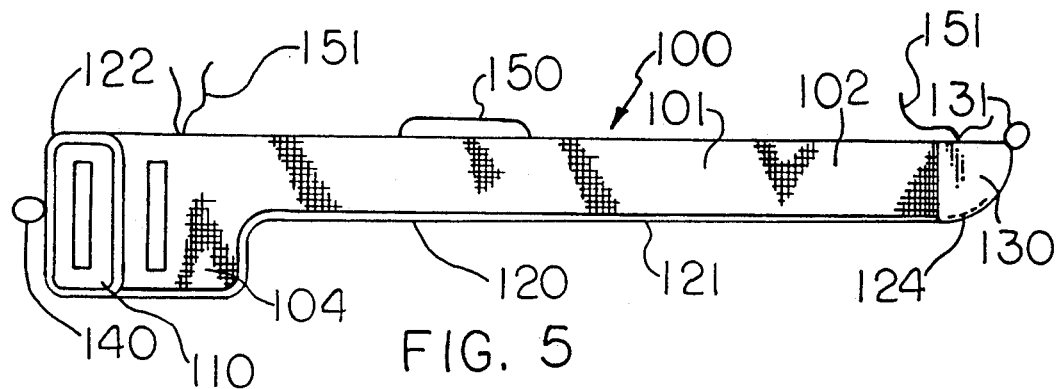
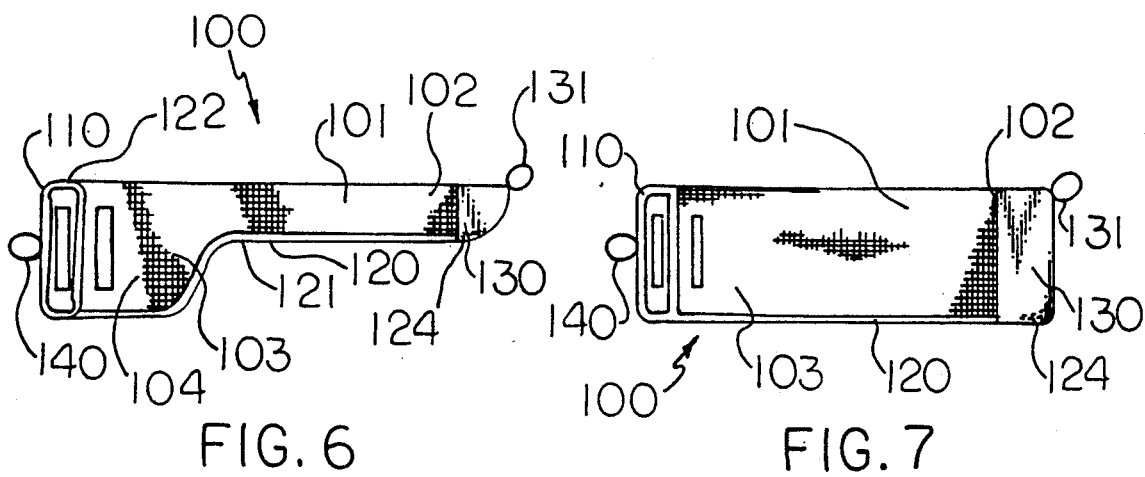

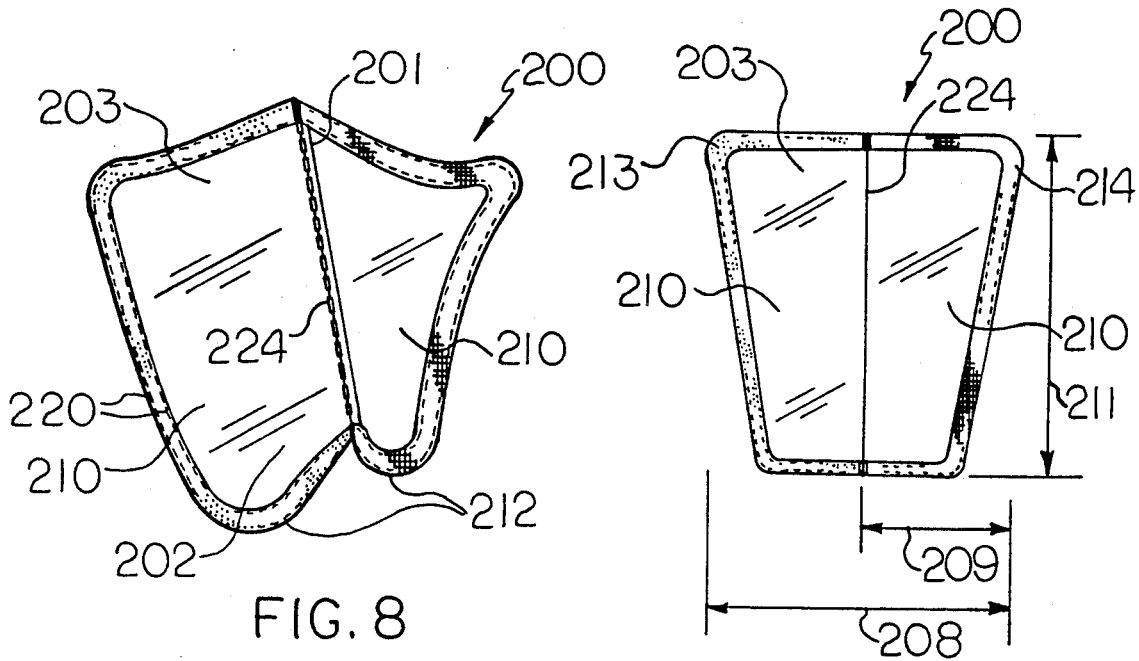
FIG. 8
FIG. 9
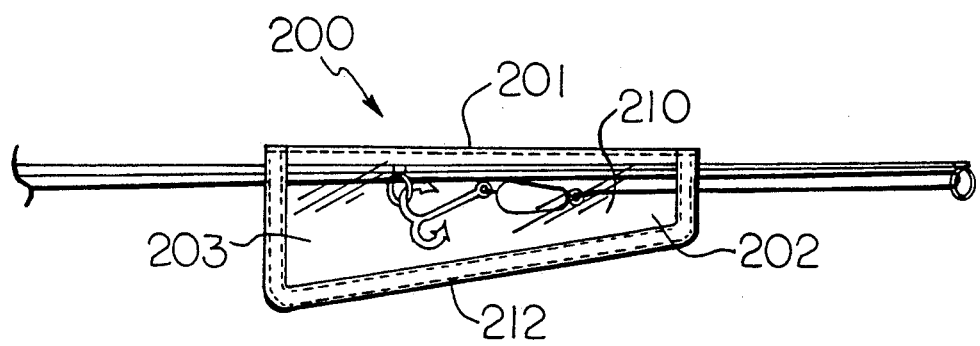
FIG. 10
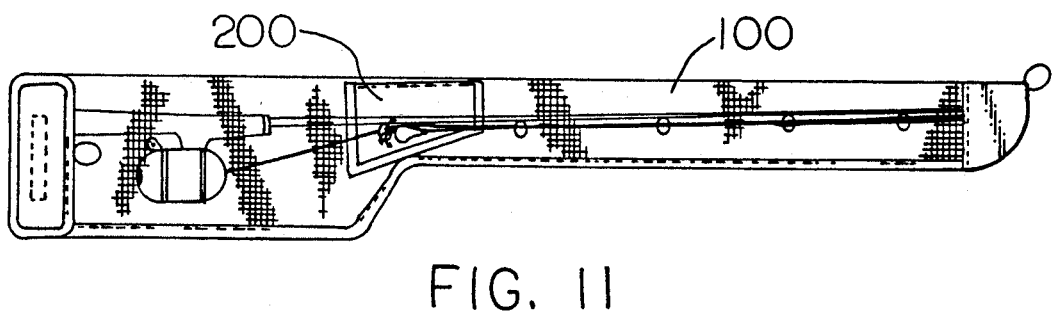
FIG. 11

SEE-THROUGH PLIABLE/PERFORATE FISHING TACKLE COVERING SYSTEM

FIELD

Of concern is a cover useful in storing fishing tackle.

BACKGROUND

One of a fisherman's most aggravating obstacles is a problem of tangled fishing lines. The problem is even worse when several fishing rods are put together in storage, in which case the tangle of the various lines in a closet, in a trunk of a car or hold of a boat, or in an ice-fisherman's bucket, can make for a fisherman's nightmare.

Various covers have been proposed to protect rods. For example, rod cases, rigid imperforate tubes with end caps, are available; rod socks of opaque cloth or felt are known. In using these, typically the rod is stripped of reel and line, and taken apart, before being inserted into the case or sock for storage. An air shipping rod case, a rigid tube with zippered end pouch, is also known generally to hold a disassembled rod, e.g., a fly rod, even though a reel may be attached to one part of the rod. In each of those covers, visual identification of enclosed tackle is hardly possible; lures or hooks typically must be removed before insertion, and each has its further drawbacks as well, not the least of which is a lack of ease of use under diverse circumstances encountered in fishing, from care and storage of the covered equipment, to transport, to stowage of empty covers, etc.

The art for a long time has lacked and needed a fishing tackle cover which can ameliorate such problems.

INVENTION SUMMARY

Provided is a fishing rod cover comprising a see-through through pliable perforate sleeve with a closure flap, that a fishing rod and reel assembly can be inserted into and removed from repeatedly, and also, a fishing hook/lure cover comprising a purse having a panel set, the purse generally having insertion and extraction ends, with a repeatedly sealable border, non-damaging to rod, line and hook and/or lure. These fishing tackle covers are useful in fishing.

At last, with a fishing rod cover of this invention, the fisherman not only can protect his rod and reel from contact with other rods and reels but also he need not disassemble his rod, reel, line and even attached single hook lure or single hook for this, more when the fishing hook/lure cover of the invention is employed where even multiple hooked rigs can be included. If that were not enough, the rod cover keeps fishing lines from tangling in cars, boats or buckets, especially when used with other covers of the invention; it permits quick visual identification and rapid removal of the assembled rod combination ready for fishing; it facilitates drying out of any wet equipment it may cover, and it may be rolled up and kept that way easily for convenient stowage. It is ideal for portaging and for trout stream fishing. The fishing hook/lure cover may be used by itself and can permit visual identification of such line terminal tackle as hooks or lures it encloses. The covers are durable. Thus, the invention receives high marks of praise from fishermen.

DRAWINGS

The drawings form part of the specification hereof. In the drawings, like numerals refer to like features.

FIG. 1 is a top plan view of a fishing rod cover of the invention, as for open-water fishing use, empty and open.

FIG. 2 is a bottom plan view of the cover of FIG. 1.

FIG. 3 is a perspective view of the cover of FIGS. 1 & 2 that is rolled up as for stowage.

FIG. 4 is a perspective view of a cover as of FIGS. 1-3, holding a fishing rod and reel assembly therein.

FIG. 5 is a top plan view of a fishing rod cover of the invention, as for fly-fishing use, empty and open.

FIG. 6 is a top plan view of a fishing rod cover of the invention, as for ice-fishing use, empty and open.

FIG. 7 is a top plan view of a fishing rod cover of the invention, as for tip-up ice-fishing use, empty and open.

FIG. 8 is a top perspective view of a hook/lure cover of the invention, open.

FIG. 9 is a bottom plan view of the cover of FIG. 8.

FIG. 10 is a side view of the cover of FIG. 8, closed and enclosing a fishing rod, line and lure.

FIG. 11 is a side view of the covered rod combination as of FIG. 10 inserted into a fishing rod cover as of FIG. 1.

FURTHER DETAIL

Patents noted herein are incorporated by reference.

The fishing tackle covers of the invention can be made by known methods. Preferably, the cover is cut and sewn. Other means to form the tackle cover of the invention may be carried out. This includes manufacture by such methods as gluing, heat-sealing, stapling, pinning, weaving, extruding, and so forth. The covers may be made from multiple piece panels. As well, for instance in the rod cover hereof, its sleeve may even be blow molded of suitable material.

In general, the fishing rod cover hereof embraces a see-through pliable perforate sleeve with a closure flap. It can have a fishing rod and reel assembly, or combination, inserted into and removed from it repeatedly. The assembly may be covered in part by the fishing hook/lure cover first.

In reference to the drawings, preferred mesh fishing rod cover 100 is depicted. It includes perforate sleeve 101, which is elongate, of a flexible mesh material such as, for example, a dimensionally stable industrial grade 1/16-inch (0.16 cm) 18×14 size mesh screening of woven fiberglass, which does not shrink or stretch and will not corrode. Such mesh is known to be suitable for making screens for tents, boats, screen houses, and bug screens. Its dimensional stability may result from or be improved by a plastic or rubbery-like coating on its warp and woof elements. Although material of the warp and woof may be opaque as, for example, with a charcoal appearing mesh screen, the perforate nature of the mesh material allows it to be seen through. Thus, the mesh material is suitably air permeable. Other mesh materials such as plastic open weave mesh as made for bag netting, signal flags, and mosquito netting, and so forth, may be employed. Plastic materials such as nylon, polyethylene, polypropylene, polyethylene-polypropylene copolymers or mixtures, polyesters, mixtures thereof, and so forth may be suitable, but the aforesaid fiberglass sleeve is more desirably employed. The sleeve 101 may be generally delineated into a rod-blank cover end 102, and a rod-handle/reel cover distension end 103 which may be asymmetrically formed as a pouch 104. Also, sleeve 101 may generally have a primary, or overall, length 105 as along a substantially straight "top" edge of the sleeve, a secondary length 106, which generally defines distance along a substantially straight "bottom" portion of the sleeve and adapted to hold an inserted rod-blank end of a fishing rod, and a pouch, or tertiary, length 107 along the edge of the pouch. Also, the elongate sleeve 101 may generally have a distension end, or primary, width 108 along a rod-inserting edge of the sleeve, and a secondary width 109, which generally defines distance that a pouch "hangs," that being the distance between the edges defining the secondary and tertiary lengths. For various applications, these may vary. As illustrations, general data sets are provided as follows:

| Feature | Open-Water | Fly-Fishing | Ice-Fishing | Tip-up |
| --- | --- | --- | --- | --- |
| 105 | 73"/185 cm | 145"/368 cm | 31"/79 cm | 21"/53 cm |
| 106 | 50"/127 cm | 136"/345 cm | 27"/69 cm | — |
| 107 | 23"/58 cm | 9"/23 cm | 14"/36 cm | — |
| 108 | 8½"/22 cm | 8"/20 cm | 8"/20 cm | 10"/25 cm |
| 109 | 4"/10 cm | 4"/10 cm | 4"/10 cm | — |

In the foregoing table, approximate dimensions are given in inches (") and centimeters (cm). The primary sleeve length is often somewhat longer than the fishing rod which is contemplated for storage therein, which can be suitably about 1 inch (ca. 2.5 cm) more than the rod. The fishing rod cover can be made thus, for example, to hold typical open-water, e.g., spinning, spin-cast, bait-cast, rods of about from 2½ to 10 feet (ca. 76 to 300 cm) in length, made in 6-inch (15-cm) increments, as by making sleeves about 31 inches (ca. 79 cm), 37 inches (ca. 94 cm), and so forth, with distension end (pouch) widths about from 8 to 12 inches (ca. 20 to 30 cm) and pouch lengths about from 7 to 30 inches (ca. 18 to 76 cm). The remaining dimensions are scaled appropriately to accommodate covering of the desired rod and reel combination. For example, a rod cover especially for an open-face rod and reel combination may be typically wider and longer at a distension (open) end than a rod cover especially for a bait cast rod and reel combination. With fly-fishing rod and reel combinations, since the reel is located nearer the butt end of the rod handle, pouches therefor can be much shorter in length, and the widths can be generally smaller; for example, an open end width of about from 7 to 9 inches (ca. 18 to 23 cm) and overall length much greater to accommodate an assembled rod may be encountered. Ice-fishing rod and reel combinations, since the reels are often the same general size as with open-face and bait cast combinations, but the rods are much shorter in length than with such, may have covers, for example, with an open end width about from 7 to 9 inches and overall length about from 20 to 41 or so inches (ca. 51 to 104 cm). Tip-up covers may be generally rectangular, for example, with widths about from 7 to 12 inches (ca. 18 to 30 cm) and lengths about from 15 to 37 or so inches (ca. 38 to 94 cm). Also preferably, in general, all rod covers open and close, and even further, hang, in the same manner.

The rod cover has a closure flap. Closure flap 110 is depicted. It can include panel 111, preferably made of the same perforate, e.g., mesh, material as the sleeve, which is adjacent distension end 103 having means for fastening 112 such as a system of well known hook 113 and loop 114 parts, which may be commercially obtainable as VELCRO, glued and/or sewn thereon. See e.g., U.S. Pat. Nos. 2,717,437 & 3,009,235. A commercial, i.e., very strongly holding, grade of VELCRO is preferred. Other means for fastening such as snaps, buttons, ties, wrap-around elastic loops, pins, magnets, low tack adhesives, even pressure applied from a spring hinge as may connect a flap portion to the sleeve, and so forth and the like, may be employed here. Desirably, the fastening means is present to be attachable in a vicinity of about 1 to 2 inches (ca. 2.5 to 5 cm) from, or closer to, an edge of the sleeve as may be formed were it to be laid flat. See e.g., FIGS. 1 & 4-7 The fastening means may be present at a suitable distance 115, e.g., about from 1 inch to 2 inches (ca. 2.5 to 5 cm), from a lower edge as may be formed by the pouch 104 of flat distension end 103 or the like, and an edge opposite to that lower edge, and the fastening means may continuously span therebetween, for example, as with a 1-inch by 5-inch (2.5 by 13 cm) hook and loop fastening system. Thus, a rod butt or handle can be prevented from escaping from the sleeve at the closure end, and yet a three dimensional form may be adapted readily by the cover of the invention when it holds the desired tackle.

Also, preferred mesh fishing rod cover 100 desirably includes multiply-stitched binding 120, rod-ferrule cap 130, means for vertical hanging such as a hanging loop 131, e.g., 1 to 2 inches, and elastic stowage loop 140, for example, as by sewing on the ends of a ¼-inch (0.635 cm) wide strip of elastic about 8 to 9 inches (ca. 20.3 to 22.9 cm) in length to make an about 4-inch (ca. 10.2 cm) loop attachment. The binding may be single stitched as from manufacture with some common binder sewing machinery, but this typically results in a cover which is weak, particularly with the employment of the aforesaid fiberglass mesh, with a propensity to tear. Also, the perforate material, e.g., mesh, may be only sewn into the sleeve from a sheet formation without the use of any binding, so that binding is absent, but typically this, too, particularly with the employment of the aforesaid fiberglass mesh, has a propensity to tear as a sleeve. The binding 120 is preferably of a supple, yet strong, material such as vinyl or acrylic bindings, for example, an acrylic binding available as a ¾-inch (1.9 cm) wide double fold strip with both top and bottom edges turned for fold-in finish top and bottom upon attachment.

Optional carrying handle 150 may be present. Also, string ties 151 may be present, which may be used to secure a covered rod to a canoe during portaging, and so forth.

Advantageously, the rod cover is made by cutting a suitable one-piece pattern of the desired supple perforate material, and attaching, for example, any rod-ferrule cap material, e.g., as by sewing it to the perforate material. This is sewn in making the sleeve, leaving the closure flap attached to an open end of the sleeve. Remaining items such as means for fastening, hanging loops, etc., and binding may be attached as desired, for example, by later or concurrent sewing. Fishing rod cover 100 of FIGS. 1-7 with its multiply-stitched binding 120 is generally made as follows: The one-piece pattern of the aforesaid fiberglass mesh is cut out to include the flap portion. A rod-ferrule cap pattern is cut of a soft durable cloth, for example, of a 7.3-ounce 1000-denier DuPont Cordura Nylon pack cloth that has been urethane coated and is water repellent. The cap in pattern is sewn onto the end of the one-piece mesh in pattern on what is to be the outside of the cover. Mesh underlies the cap cloth. The combined flat pattern is sewn with suitable thread to along incipient "bottom"

edge, making the sleeve. A woven nylon cord (about 3/32 of an inch in diameter, i.e., ca. 0.24 cm) about 4½ to 5 inches (ca. 11.4 to 12.7 cm) in length is formed into a tear-drop shaped loop, and the two loose ends are sewn onto the tip of the cap, for about ¼ to ½ of an inch (ca. 0.64 to 1.27 cm) along the edge of the cap to provide the hanging loop 131. Then the binding is sewn on, and over the hanging loop, first while the binding lies flat through a reverse side and into the mesh alone, which is once-sewn mesh as concerns the sleeve, leaving the obverse part of the binding lying flat and unsewn at this point, and second, sewing folded over obverse binding right through the mesh and reverse binding. Next, the elastic stowage loop 140 is formed and attached to the flap, and the hook and loop portions are set in place using their adhesive backs and then sewn on. Along the sleeve "bottom," or lower border, sleeve bottom binding 121 is triple-stitched, and is most difficult to tear, and along the remaining edges, flap edge binding 122 and sleeve opening binding 123 are double stitched. Quadruply-stitched binding 124 ma accordingly reside by the rod ferrule cover. The VELCRO (113 & 114) is also securely sewn in place. A preferred sewing thread is strong, non-abrasive, waterproof, and sun, gas and oil resistant. Such can include commercially available nylon, polyester and Dacron, especially ultraviolet (UV) resistant, threads. For example, a polymatic, style #FF, ravel and knot resistant during sewing, bonded monocord Dacron thread treated for maximum resistance to UV degradation in sunlight and to mild acids, is advantageously employed. Other items may be attached as desired and/or appropriate.

The rod cover may come in various colors. As well, more optional components may be present with it. For example, a soft pocket for holding items (not depicted) may be present.

In use, the fishing rod cover of the invention has many advantages. Further to those already mentioned, it is readily stowable, even when this is attempted in a rocking boat under adverse weather conditions during fishing. This can be accomplished, for example, by merely rolling up the empty cover, preferably securing it in a rolled up state by merely pulling the roll through an elastic stowage loop 140 that is part of the rod cover. See, FIG. 3. Alternatively, the rod cover may be provided with an extra hook fastener portion on the other outside part of the sleeve reverse to that of depicted hook portion 114, which correspond to the loop fastener portion 113, and such an extra hook fastener portion 117 is illustrated in phantom in FIG. 2. In such a way, the rod cover is rolled up to so that loop portion 113 and extra hook portion 117 register to secure the roll. When rolled, it is readily stowable not only in car trunk or boat hold but also in overall or jacket pockets or in a hat. As well, the rod cover may float, e.g., on its own in calm water for about 15 or so minutes, or it may be made to float for longer periods by adding flotation means therewith.

The fishing rod cover of the invention may be considered to be generally enantiomeric in certain embodiments such as, for example, those with the closure flap and distension ends shown. So, it may be made in left and right hand versions.

In general as well, the fishing hook/lure cover hereof embraces a purse with a panel set with a border closure. It may be considered to have insertion and extraction ends. It is repeatedly openable and closable. Its sealable border is non-damaging to rod, line and hook and/or lure.

Also in reference to the drawings, fishing hook/lure cover 200 is depicted. It includes purse 201 having panel set 210 a provided by a tough material such as a tightly woven cloth or a sheetlike plastic, preferably at least one and especially two panels of which are see-through as, for example, of a 16-gauge (clear) vinyl or the like. The purse may be generally delineated as having a first, or insertion, end 202 and a second, or extraction, end 203 and an overall length 205 and width 208. The overall length may be any suitable length, which includes lengths about from 4 to 18 inches (ca. 10 to 46 cm), for example, about 9 inches (ca. 23 cm) or so. The overall width may be any suitable width, which includes widths about from 4 to 12 inches (ca. 10 to 30 cm), for example about 9½ inches (ca. 24 cm) or so. Folded, or closed, width 209 is generally about one-half that of the overall width. Border closure 212 is present and is non-damaging to rod, line and hook and/or lure, and it may be suitably provided as from attached in magnet sets, interspaced snaps, buttons or the like, molded soft plastic zipper, or preferably hook 213 and loop 214 such as from an about ½ to ¾-inch (ca. 1.3 to 1.9 cm) industrial grade VELCRO, which may be emplaced with pressure sensitive adhesive on its reverse sides and sewn in multiple rows 220 with the aforesaid thread. Top stitch 224 may be, for example, single or double, which assists in providing open opposed panels in a V-shape; thus, the cover 200 with such top stitching or the like can be balanced in an inverted (wish bone) manner along the top stitch 224 or the like segment for ready closure using one-hand to close it over rod, line and hook/lure as commonly strung and placed into an eye or line guide of the rod. Provision, when closed, as a generally trapezoid, trapezium, or triangle shaped item, with rounded or curved closing side intersections 225 ("vertices") and with a suitably small width, e.g., with its intended insertion end smaller in width than its intended extraction end, assists in inserting and removing cover 200 enclosing a part of a fishing rod/accessory tackle combination, into and from cover 100 or the like.

Accordingly with the fishing hook/lure cover of the invention, even multiple barb or point, or gang, hooks and hooked lures can be quickly covered while still strung on the rod, and the covered hook or lure, while still on the rod, can easily be inserted into and extracted from the fishing rod cover of the invention. Ready identification is accordingly possible of such covered fishing tackle.

The fishing hook/lure cover of the invention may come in any of various colors, especially about its border. It too may have optional ties, loops, pockets, and so forth, added. It may be made to float as well.

Preferably, metal is absent from the fishing tackle covers of the invention. Other relatively hard materials such as plastic or wooden buttons are absent as well. For instance, grommets are preferably absent, especially in a rod cover 100 as inset into the sleeve 101 including its rod-ferrule cap 130, desirably are absent. For another instance, snaps are preferably absent, especially in a hook/lure cover 200 as part of the border closure 212 most especially along its widths. The fishing tackle cover is advantageously relatively soft and non-scratching to the equipment coverable therein.

Dedicated research and development has resulted in the covers hereof overcoming the numerous problems in the art and providing the many advantages that they do. Numerous further advantages attend the invention.

CONCLUSION

The present invention is thus provided. Numerous adaptations and modifications can be effected within the spirit of the invention, the distinctly asserted scope of which is particularly printed out as follows:

I claim:

1. A fishing rod cover comprising a see-through, pliable, perforate, dimensionally stable mesh screen sleeve with a closure flap, that a fishing rod and reel assembly can be inserted into and removed from readily and repeatedly.

2. The cover of claim 1, which includes a distension adjacent an opening by the closure flap, that is suitable for enclosing the reel of said assembly.

3. The cover of claim 2, which is made from a pattern, and which has a single-switched seam along an edge thereof.

4. The cover of claim 3, wherein said mesh sleeve and closure flap is made of a one-piece fiberglass mesh screen and wherein a closure flap panel is thereby provided, plus which cover includes a means for fastening the sleeve and the panel.

5. The cover of claim 2, which is made from a pattern, and which includes a binding which is singly-stitched.

6. The cover of claim 5, wherein said mesh sleeve and closure flap is made of a one-piece fiberglass mesh screen and wherein a closure flap panel is thereby provided, plus which cover includes a means for fastening the sleeve and the panel.

7. The cover of claim 2, which is made from a pattern, and which includes a binding which is multiply-stitched.

8. The cover of claim 7, wherein said mesh sleeve and closure flap is made of a one-piece fiberglass mesh screen and wherein a closure flap panel is thereby provided, plus which cover includes a means for fastening the sleeve and the panel.

9. The cover of claim 2, wherein said mesh sleeve and closure flap is made of a one-piece fiberglass mesh screen which provides a closure flap panel, plus which cover includes a means for fastening the sleeve and the panel.

10. The cover of claim 9, which includes an elastic stowage loop attached to the closure flap panel.

11. The cover of claim 10, which includes a rod-ferrule cap opposite the closure flap panel of the sleeve.

12. The cover of claim 11, which includes a hanging storage loop attached to the sleeve near an end thereof opposite to that of the closure flap panel.

13. The cover of claim 12, which has the means for fastening about 1 to 2 inches from the top and bottom edges of the sleeve and closure flap panel.

14. The cover of claim 13, wherein the means for fastening is a hook and loop pair.

15. The cover of claim 1, wherein said mesh sleeve and closure flap is made of a one-piece fiberglass mesh screen and wherein a closure flap panel is thereby provided, plus which cover includes a means for fastening the sleeve and the panel.

16. A cover useful for covering a fishing hook and/or a fishing lure rigged on a fishing rod comprising a purse having a panel set, the purse generally having insertion and extraction ends, with a repeatedly sealable border, non-damaging to rod, line and hook and/or lure, wherein a top stitch is present on the panels, which, when the cover is open, assists in providing the panels in a V-shape configuration, such that the cover can be employed to cover not only the fishing hook or fishing lure rigged on a fishing rod but also a portion of the fishing rod by the panels below the top stitch, and such that the fishing rod cannot be enclosed by the panels above the top stitch.

17. The cover of claim 16, with a see-through panel set.

18. The cover of claim 17, with a hook and loop border.

19. The cover of claim 17, wherein the insertion end has a shorter width than the extraction end has.

20. A fishing tackle combination, comprising a hook and/or lure rigged on a fishing rod, reel and line assembly having closed thereover a cover useful for covering a fishing hook and/or a fishing lure rigged on a fishing rod which comprises a purse having a see-through panel set, the purse generally having insertion and extraction ends, with a repeatedly sealable border, non-damaging to rod, line and hook and/or lure, wherein a top stitch is present on the panels, which, when the cover is open, assists in providing the panels in a V-shape configuration, wherein the cover covers not only the fishing hook and/or fishing lure rigged on a fishing rod but also a portion of the fishing rod, proximate the fishing hook and/or fishing lure, by the panels below the top stitch, and wherein the fishing rod is not enclosed by the panels above the top stitch, the same covered fishing hook and/or lure and rod being inserted into a fishing rod cover which comprises a see-through, pliable, perforate, dimensionally stable fiberglass mesh screen sleeve with a closure flap panel, that a fishing rod and reel assembly can be inserted into and removed from readily and repeatedly.

* * * * *